(12) United States Patent
Fiocchi et al.

(10) Patent No.: US 10,932,600 B2
(45) Date of Patent: Mar. 2, 2021

(54) OYSTER SHUCKER APPARATUS AND METHODS OF USING THE SAME

(71) Applicant: Jinyi Scoggin Fiocchi, Highland Park, IL (US)

(72) Inventors: Jinyi Scoggin Fiocchi, Highland Park, IL (US); James Fiocchi, Highland Park, IL (US)

(73) Assignee: Jinyi Scoggin Fiocchi, Highland Park, IL (US)

( * ) Notice: Subject to any disclaimer, the term of this patent is extended or adjusted under 35 U.S.C. 154(b) by 0 days.

(21) Appl. No.: 16/691,204

(22) Filed: Nov. 21, 2019

(65) Prior Publication Data
US 2020/0237128 A1    Jul. 30, 2020

Related U.S. Application Data

(63) Continuation-in-part of application No. 16/257,901, filed on Jan. 25, 2019, now Pat. No. 10,588,324.

(51) Int. Cl.
  *A47G 21/06*    (2006.01)
(52) U.S. Cl.
  CPC ......... *A47G 21/063* (2013.01); *A47G 21/065* (2013.01)
(58) Field of Classification Search
  CPC ............................. A47G 21/00; A47G 21/063
  USPC ........................................ 452/13, 12, 16, 17
  See application file for complete search history.

(56) References Cited

U.S. PATENT DOCUMENTS

| | | | | |
|---|---|---|---|---|
| 299,756 | A * | 6/1884 | drake | A47G 21/063 452/13 |
| 2,612,653 | A * | 10/1952 | Labat | A47G 21/063 452/13 |
| 4,059,870 | A * | 11/1977 | Finkelman | A47G 21/063 452/17 |
| 4,133,078 | A * | 1/1979 | Cromwell | A47G 21/065 452/17 |
| 5,599,228 | A * | 2/1997 | Thibault | A22C 29/046 269/287 |
| 5,715,736 | A * | 2/1998 | Cherney | A47J 43/18 269/3 |
| 6,785,967 | B1 * | 9/2004 | Allievi | A47G 21/065 30/120.1 |
| 7,674,159 | B1 * | 3/2010 | Littledeer | A47J 47/005 452/13 |
| 9,021,945 | B2 * | 5/2015 | Gratta | A47J 43/26 99/582 |
| 10,588,324 | B1 * | 3/2020 | Fiocchi | A47G 21/063 |
| 2007/0042695 | A1 * | 2/2007 | Chong | A22C 29/046 452/16 |
| 2011/0247898 | A1 * | 10/2011 | Wigutoff | E04G 1/28 182/223 |
| 2012/0231708 | A1 * | 9/2012 | Pahl | B24D 11/02 451/59 |

* cited by examiner

*Primary Examiner* — Richard T Price, Jr.
(74) *Attorney, Agent, or Firm* — Scherrer Patent & Trademark Law, P.C.; Stephen T. Scherrer; Monique A. Morneault

(57) ABSTRACT

An oyster shucker apparatus comprises a base element comprising a first indentation, a cover element connected at an angle to an end of the base element, either removably connected thereto or hinged thereto, the cover element having a second indentation, the first and second indentations sized and configured to hold an oyster therein. A user holds an oyster therein and, with a knife, is able to easily open the oyster with minimal risk of injury.

20 Claims, 4 Drawing Sheets

OYSTER SHUCKER APPARATUS AND METHODS OF USING THE SAME

CROSS-REFERENCE TO RELATED APPLICATIONS

The present invention claims priority as a continuation-in-part application of U.S. patent application Ser. No. 16/257,901, now U.S. Pat. No. 10,588,324, titled "Oyster Shucker Apparatus and Methods of Using the Same," filed Jan. 25, 2019, which is incorporated herein by reference in its entirety.

TECHNICAL FIELD

The present invention relates to an oyster shucker apparatus. Specifically, the oyster shucker apparatus comprises a base element comprising a first indentation, a cover element connected at an angle to an end of the base element, either removably connected thereto or hinged thereto, the cover element having a second indentation, the first and second indentations sized and configured to hold an oyster therein. A user holds an oyster therein and, with a knife, is able to easily open the oyster with minimal risk of injury.

BACKGROUND

It is generally known to utilize tools to open an oyster, which is desirable to obtain the oyster meat therein and also for finding pearls cultivated by the oyster. This process is often referred to as "shucking" an oyster. Specifically, it is well-known to utilize knives and other tools to pry open the oyster by slicing between each oyster shell. Oftentimes, oysters are opened in rapid succession to maximize the amount of meat and/or pearls. However, the use of knives to open oysters can lead to injuries, especially if an oyster is simply held by a user's hands and pried open with the use of the knife blade. Opening an oyster can be tough, and the knife blade must often be forcefully wedged between the shells with force. Due to the force required, irregularity of the oyster shells, and size and shape thereof, a knife can slip, causing injury if the knife blade cuts the user's hand. A need therefore exists for an improved oyster shucker apparatus. Specifically, a need exists for an oyster shucker apparatus that minimizes injuries to users thereof.

One method to minimize injuries is to simply wrap an oyster in a towel, and use a knife to pry open the oyster. The towel can be held by a user, but oftentimes a user can still become injured as the towel is often bulky and makes it difficult to hold and lock the oyster in place for shucking. Likewise, a user can still become injured if a knife punctures or pierces the towel while shucking. A need, therefore, exists for an oyster shucker apparatus that allows a user to more easily hold and grip an oyster therein. Specifically, a need exists for an oyster shucker apparatus that allows a user to hold the oyster in the best position to pry open the oyster, without the oyster slipping or moving.

Various protective devices may be utilized to prevent injuries when opening oysters with knives. Specifically, one way is to wear protective gear, such as protective clothing and, especially, protective gloves. Specifically, heavy leather gloves or chainmail gloves may be utilized to protect one's hands when shucking oysters with knives. However, gloves often make it difficult to hold and handle an oyster, often contributing to a user fumbling an oyster and misaligning the knife when separating the shells from each other. A need, therefore, exists for an oyster shucker apparatus that frees users' hands for shucking oysters. Specifically, a need exists for an oyster shucker apparatus that allows a user to more easily manipulate an oyster during the shucking thereof.

Another oyster shucking apparatus utilizes a piercing element to pierce the oyster shell with a blade extending from a rig. Similarly, apparatuses utilizing handles designed to press against oysters to force the shells apart are also known. However, these apparatuses are often difficult to control, and often cause shells to break apart, pieces of which may become embedded or otherwise mixed with the meat of the oysters. It is difficult to remove shell pieces from oyster meat. A need, therefore, exists for an oyster shucker apparatus that cleanly opens an oyster and minimizes loose shell pieces. Specifically, a need exists for an oyster shucker apparatus that maintains oyster shells intact and aids in preventing shell pieces from becoming embedded in or otherwise mixing with oyster meat.

Oftentimes, oyster shucking apparatuses may be difficult to use because they only accommodate specifically sized oysters. Therefore, oysters that fall outside of the size range useful for the shucking apparatus may not be utilized to shuck the oyster. Considering that oysters come in all manner of shapes and sizes, it is often difficult to utilize a common oyster shucking apparatus to maximize the number of oysters that can be shucked. A need, therefore, exists for an oyster shucker apparatus that can accommodate many different sizes and shapes of oysters. Specifically, a need exists for an oyster shucker apparatus that can be expanded or contracted to fit the particular size of oyster being shucked.

Moreover, oyster shucking apparatuses may become soiled or dirty, and organic material, such as pieces of oyster shell and/or meat, may become lodged in the oyster shucking apparatuses. As this material decays, it can grow bacteria and/or other pathogens, and may not be hygienic when used repeatedly. Such apparatuses are often difficult to clean. A need, therefore, exists for an oyster shucker apparatus that is easily cleanable. More specifically, a need exists for an oyster shucker apparatus that may easily be separated into easily-cleanable elements.

Further, oysters may be difficult to manage, hold, control and shucked because they can be slippery, and difficult to hold in place. Present oyster shucking apparatuses are typically made from metal, plastic or other like material that can make it difficult to hold the oyster in place effectively due to their slippery surfaces. This may lead to injuries and other difficulties when shucking the oyster with a knife. A need, therefore, exists for oyster shucking apparatuses having a non-slip surface to aid in maintaining an oyster in place during shucking thereof. More specifically, a need exists for a non-slip coating or other additive on a surface of an oyster shucking apparatus to hold the oyster and prevent slippage thereof.

SUMMARY OF THE INVENTION

The present invention relates to an oyster shucker apparatus. Specifically, the oyster shucker apparatus comprises a base element comprising a first indentation, a cover element connected at an angle to an end of the base element, either removably connected thereto or hinged thereto, the cover element having a second indentation, the first and second indentations sized and configured to hold an oyster therein. A user holds an oyster therein and, with a knife, is able to easily open the oyster with minimal risk of injury.

To this end, in an embodiment of the present invention, an oyster shucker apparatus is provided. The oyster shucker apparatus comprises: a base element comprising a first planar material having a first end and a second end; and a cover element comprising a second planar material rotatably attached on a first end thereof to the first end of the base element via a hinge, wherein the cover element is rotatable relative to the base element forming a changeable space therebetween, wherein the space is configured to hold an oyster therein for shucking the same with a knife.

In an embodiment, the oyster shucker apparatus further comprises: an indentation in the base element configured to hold the oyster therein.

In an embodiment, the oyster shucker apparatus further comprises: an indentation in the cover element configured to hold the oyster therein.

In an embodiment, the oyster shucker apparatus further comprises: a first indentation in the base element; and a second indentation in the cover element, wherein the first and second indentations are configured to hold an oyster therein.

In an embodiment, the base element comprises a first knuckle and the cover element comprises a second knuckle, wherein a pin holds the first knuckle and the second knuckle together to from the hinge.

In an embodiment, the oyster shucker apparatus further comprises: an angled surface on the base element, wherein the angled surface is configured to abut in parallel a bottom surface of the cover element when the cover element is rotated toward the base element.

In an embodiment, the cover element extends upwardly from the base element at the hinge at an acute angle.

In an embodiment, the oyster shucker apparatus further comprises: a lip extending downwardly at the second end of the base element, the lip configured to abut a side surface of a table on which the apparatus is placed.

In an alternate embodiment of the present invention, an oyster shucker system is provided. The oyster shucker system comprises: the oyster shucker apparatus; and an oyster contained between the base element and the cover element.

In an embodiment, the oyster shucker system further comprises: a knife configured to pry open the oyster contained between the base element and the cover element.

In an alternate embodiment of the present invention, a method of shucking an oyster is provided. The method comprises the steps of: providing the oyster shucker apparatus; placing an oyster between the base element and the cover element; and opening the oyster using a knife by prying the oyster open while the oyster is disposed between the base element and the cover element.

In an embodiment, the method further comprises the step of: rotating the cover element toward and away from the base element to accommodate the size of the oyster contained therebetween.

In an alternate embodiment of the present invention, an oyster shucker apparatus is provided. The oyster shucker apparatus comprises: a base element comprising a first planar material having a first end and a second end; and a cover element comprising a second planar material removably attached on a first end thereof to the first end of the base element, wherein the cover element and the base element form a space therebetween, wherein the space is configured to hold an oyster therein for shucking the same with a knife.

In an embodiment, the oyster shucker apparatus further comprises: an extending element extending from the first end of the cover element; and a receiving aperture within the first end of the base element, wherein the extending element of the cover element is slidably disposed within the receiving aperture of the base element.

In an embodiment, the oyster shucker apparatus further comprises: an extending element extending from the first end of the base element; and a receiving aperture within the first end of the cover element, wherein the extending element of the base element is slidably disposed within the receiving aperture of the cover element.

In an embodiment, the base element and the cover element are held together with a dovetail joint.

In an embodiment, the oyster shucker apparatus further comprising: a first indentation in the base element; and a second indentation in the cover element, wherein the first and second indentations are configured to hold an oyster therein.

In an embodiment, the oyster shucker apparatus further comprises: a lip extending downwardly at the second end of the base element, the lip configured to abut a side surface of a table on which the apparatus is placed.

In an embodiment, the cover element extends upwardly from the base element at the hinge at an acute angle.

In an alternate embodiment of the present invention, an oyster shucker system is provided. The oyster shucker system comprises: the oyster shucker apparatus; and an oyster contained between the base element and the cover element.

It is, therefore, an advantage and objective of the present invention to provide an improved oyster shucker apparatus.

Specifically, it is an advantage and objective of the present invention to provide an oyster shucker apparatus that minimizes injuries to users thereof.

Moreover, it is an advantage and objective of the present invention to provide an oyster shucker apparatus that allows a user to more easily hold and grip an oyster therein.

More specifically, it is an advantage and objective of the present invention to provide an oyster shucker apparatus that allows a user to hold the oyster in the best position to pry open the oyster, without the oyster slipping or moving.

Further, it is an advantage and objective of the present invention to provide an oyster shucker apparatus that frees users' hands for shucking oysters.

Still further, it is an advantage and objective of the present invention to provide an oyster shucker apparatus that allows a user to more easily manipulate an oyster during the shucking thereof.

In addition, it is an advantage and objective of the present invention to provide an oyster shucker apparatus that cleanly opens an oyster and minimizes loose shell pieces.

Moreover, it is an advantage and objective of the present invention to provide an oyster shucker apparatus that maintains oyster shells intact and aids in preventing shell pieces from becoming embedded in or otherwise mixing with oyster meat.

And, it is an advantage and objective of the present invention to provide an oyster shucker apparatus that can accommodate many different sizes and shapes of oysters.

More specifically, it is an advantage and objective of the present invention to provide an oyster shucker apparatus that can be expanded or contracted to fit the particular size of oyster being shucked.

Further, it is an advantage and objective of the present invention to provide an oyster shucker apparatus that is easily cleanable.

Still further, it is an advantage and objective of the present invention to provide an oyster shucker apparatus that may easily be separated into easily-cleanable elements.

Moreover, it is an advantage and objective of the present invention to provide oyster shucking apparatuses having a non-slip surface to aid in maintaining an oyster in place during shucking thereof.

More specifically, it is an advantage and objective of the present invention to provide a non-slip coating or other additive on a surface of an oyster shucking apparatus to hold the oyster and prevent slippage thereof.

Additional features and advantages of the present invention are described in, and will be apparent from, the detailed description of the presently preferred embodiments and from the drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE PRESENTLY PREFERRED EMBODIMENTS

The present invention relates to an oyster shucker apparatus. Specifically, the oyster shucker apparatus comprises a base element comprising a first indentation, a cover element connected at an angle to an end of the base element, either removably connected thereto or hinged thereto, the cover element having a second indentation, the first and second indentations sized and configured to hold an oyster therein. A user holds an oyster therein and, with a knife, is able to easily open the oyster with minimal risk of injury.

Figure 1:
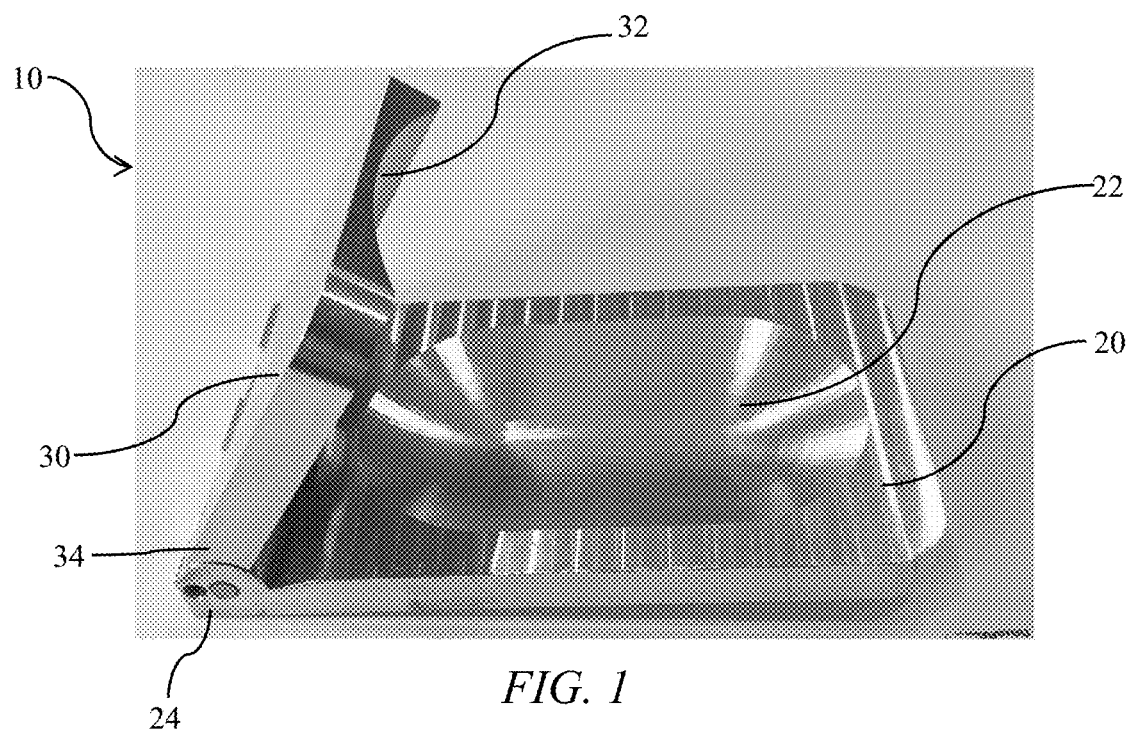
FIG. 1 illustrates a side view of an oyster shucker apparatus in an embodiment of the present invention.
Figure 2:
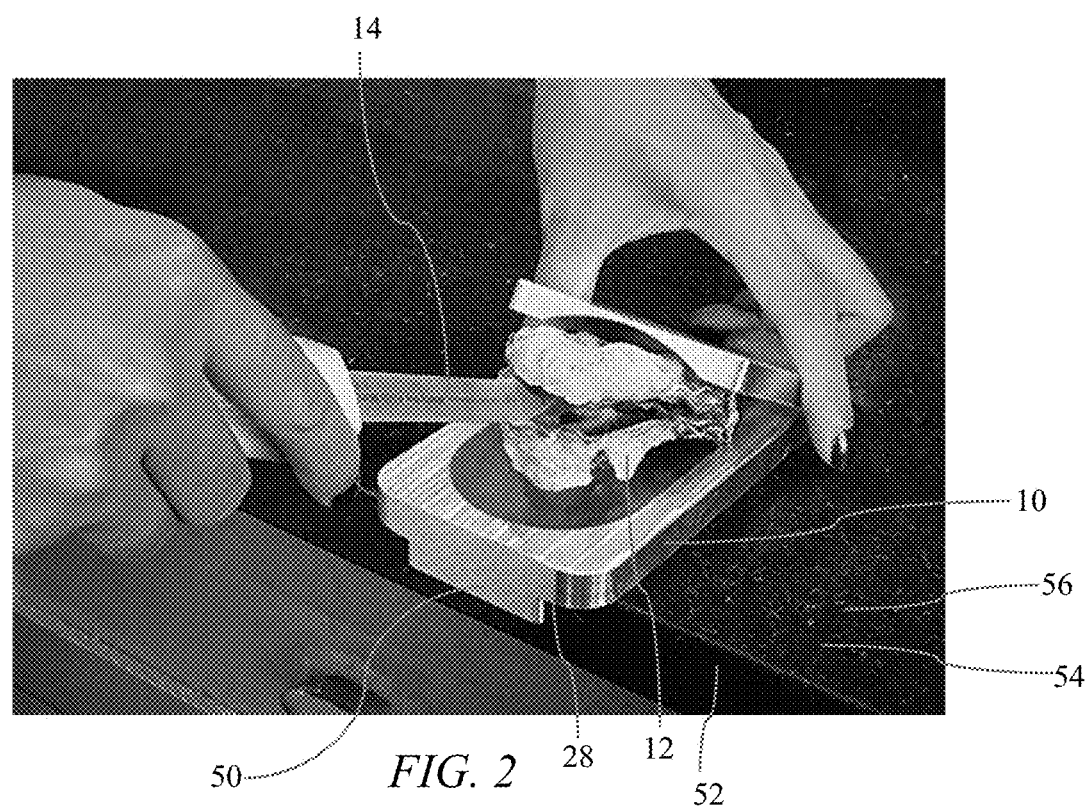
FIG. 2 illustrates a perspective view of an oyster shucking system comprising an oyster shucker apparatus, an oyster, and an oyster shucking knife in an embodiment of the present invention.

Now referring to the figures, wherein like numerals refer to like parts, FIG. 1 illustrates an oyster shucker apparatus 10 in an embodiment of the present invention. The oyster shucker apparatus 10 is designed to hold an oyster 12 therein, allowing a user to utilize an oyster-opening knife 14 to open the oyster, minimizing injury to a user thereof, as illustrated in FIG. 2. More specifically, the oyster shucker apparatus 10 is sized and shaped to hold the oyster 12 therein, shielding a user's hands from the oyster shucking knife 14 that may be utilized to pry the oyster there open to obtain the meat and/or pearls therein.

As illustrated in FIG. 1, the oyster shucker apparatus 10 comprises a base element 20 comprising, generally, a relatively planar material having sufficient strength and rigidity to hold an oyster therein while shucking the same, and providing shielding protection for a user or a surface on which the oyster is shucked, such as a table or the like. Preferably, the base element 20 is made from metal, such as aluminum, steel, or other like metals useful for both strength and rigidity, as noted above. An oval-shaped indentation 22 may be provided in the base element, which may be useful to hold an oyster 12 therein.

A cover element 30 may be attached to an end 24 of the base element, and may extend upwardly at an acute angle relatively to the base element 20. The cover element may comprise, generally, a relatively planar material, also having sufficient strength and rigidity to further hold an oyster 12 while the oyster 12 is held within the indentation 22 of the base element 20. The cover element 30 may cover or partially cover the oyster 12 so that, when held by a user prying the oyster open with a knife 14, the user's hands may be protected. Moreover, the cover element 30 may comprise a semi-oval-shaped indentation 32, thereby holding the oyster 12 therein so that the same may be shucked easily. Thus, the base element 20 and the cover element 30, and respective indentations 22, 32, may coordinate to both hold an oyster 12 in place so that the same may be shucked by a user, and to shield the user from injury during the shucking process.

In a preferred embodiment, illustrated in FIGS. 1-4, the cover element 30 may be rotatably connected via a hinge 40, on end 34 thereof, to end 24 of the base element 20. Thus, the cover element 30 may open or close relatively to the base element 20, as desired by the user. Specifically, a relatively large oyster may require a larger space between the base element 20 and the cover element 30, and so the cover element 30 may be rotated on the hinge 40 away from the base element 20, thereby providing a relatively larger space in which to hold an oyster. Such a space may be shown by the oyster shucker apparatus 10 illustrated in FIG. 1, wherein the cover element 30 is disposed at a relatively large acute angle relative to the base element 20. Likewise, a relatively small oyster may require a smaller space between the base element 20 and the cover element 30, and so the cover element 30 may be rotated on the hinge 40 toward the base element 20, thereby providing a relatively smaller space in which to hold an oyster.

Figure 4:
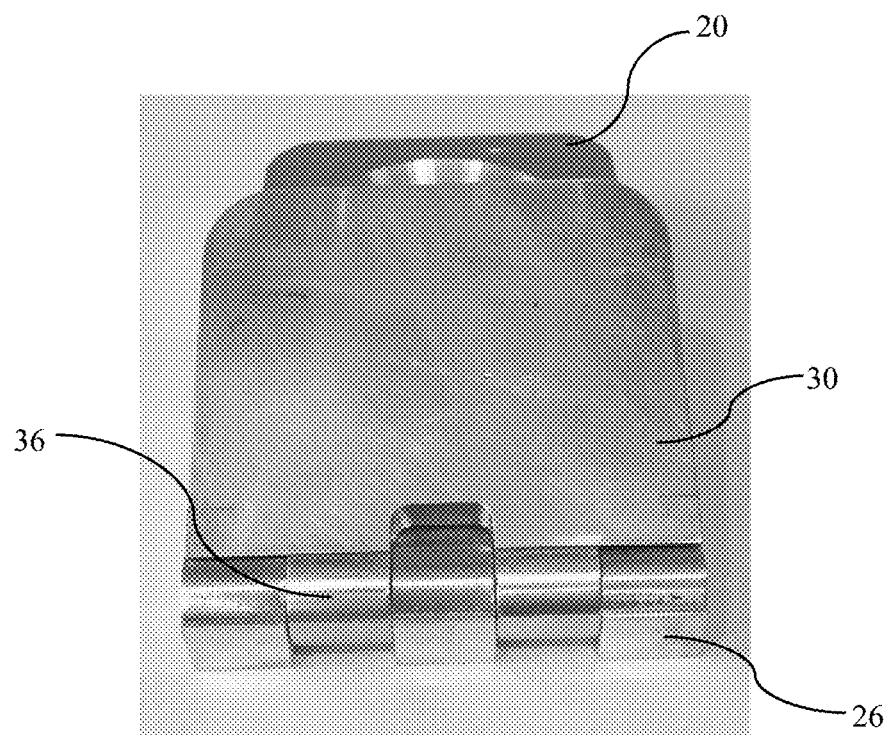
FIG. 4 illustrates an end close-up view of a hinge of an oyster shucker apparatus in an embodiment of the present invention.

As shown in FIG. 4, the base element 20 may include a plurality of knuckles 26 whereas the cover element 30 may include a plurality of knuckles 36 that may be held together via a pin 42. Specifically, the base element 20 is illustrated with 3 knuckles 26 and the cover element 30 is illustrated with 2 knuckles 36, although there may be any number of knuckles in both the base element 20 and cover element 30 as necessary to solidly hold the cover element 30 over the base element 20.

Figure 3:
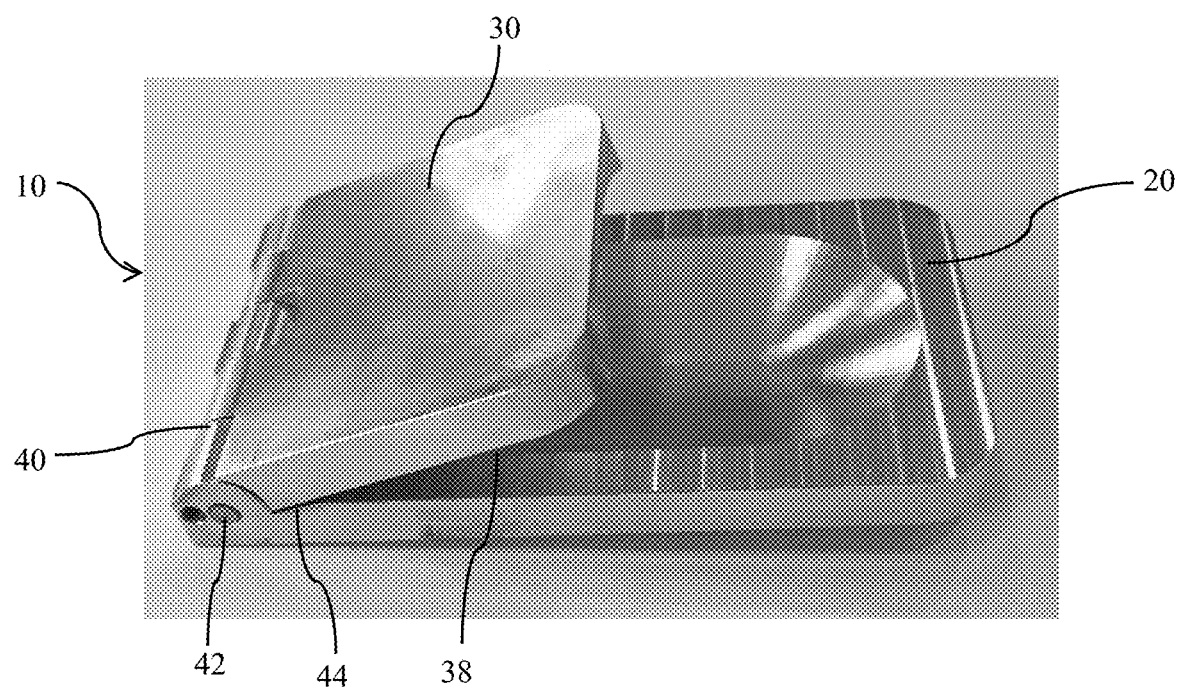
FIG. 3 illustrates a side view of an oyster shucker apparatus hingedly rotated to form a relatively small space for a relatively small oyster in an embodiment of the present invention.

The cover element 30 may be rotatable toward the base element 20 via hinge 42 until a bottom surface 38 of the cover element 30 abuts an angled stopping surface 44, as illustrated in FIG. 3. Thus, the cover element 30 may be prevented from fully closing on the base element 20 and the cover element 30 may be disposed at least some angle over the base element 20.

As illustrated in FIG. 2, a flange or lip 50 may extend downwardly from a second end 28 of the base element 20.

The flange or lip 50 may be disposed adjacent a side end 52 of a table 54, with the base element 20 disposed on a top surface 56 of the table 54. The flange or lip 50 may be utilized to better hold the oyster shucker apparatus 10 in position on a surface, thereby aiding a user as the user holds the apparatus 10 and, therefore, the oyster 12 therein steady while the user pries open the oyster 12 with the knife 14.

Figure 5:
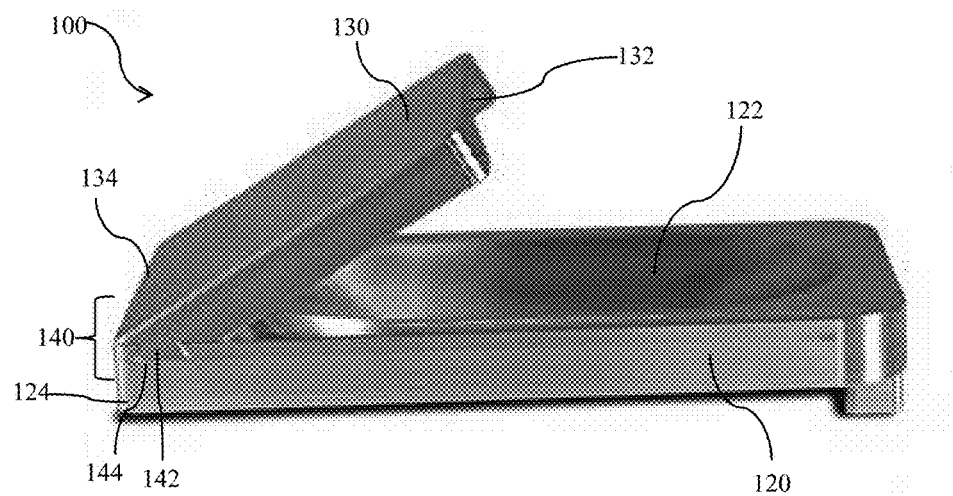
FIG. 5 illustrates a side view of an oyster shucker apparatus comprising a dovetail joint between a cover element and a base element in an alternate embodiment of the present invention.
Figures 6, 7:
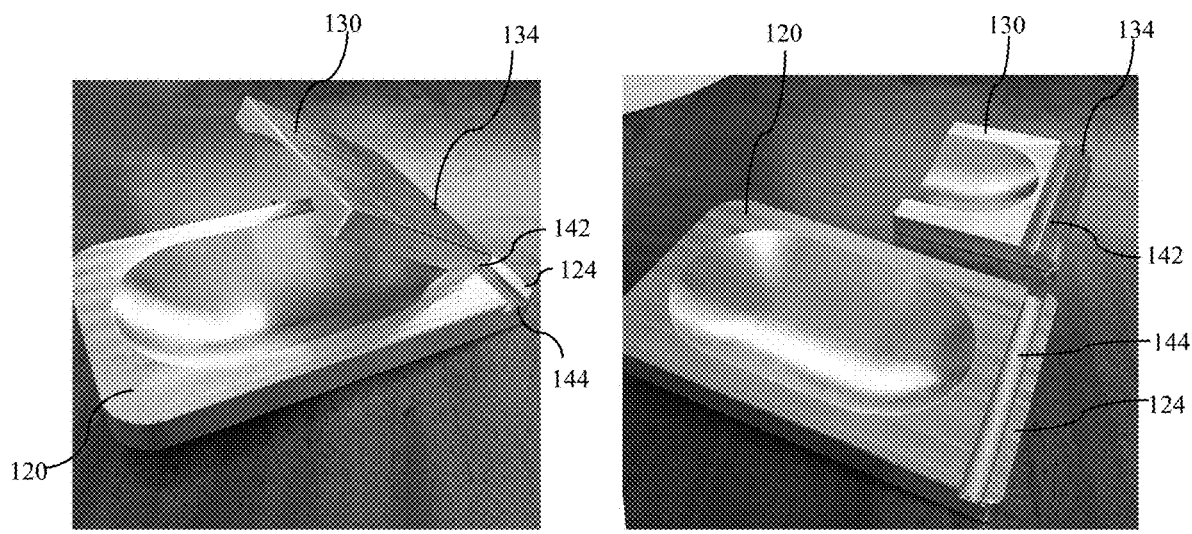
FIG. 6 illustrates a perspective view of an oyster shucker apparatus comprising a laterally movable cover element in an embodiment of the present invention.
FIG. 7 illustrates a perspective view of an oyster shucker apparatus wherein the cover element is removed from the base element in an embodiment of the present invention.

In an alternate embodiment of the present invention, illustrated in FIGS. 5-7, an oyster shucker apparatus 100 is illustrated. The oyster shucker apparatus 100 is designed to hold an oyster therein as illustrated above with reference to FIGS. 1-4, allowing a user to utilize an oyster-opening knife to open the oyster, minimizing injury to a user thereof.

As illustrated in FIG. 5, the oyster shucker apparatus 100 comprises a base element 120 comprising, generally, a relatively planar material having sufficient strength and rigidity to hold an oyster therein while shucking the same, and providing shielding protection for a user or a surface on which the oyster is shucked, such as a table or the like. Preferably, the base element 120 is made from metal, such as aluminum, steel, or other like metals useful for both strength and rigidity, as noted above. An oval-shaped indentation 122 may be provided in the base element, which may be useful to hold an oyster therein.

A cover element 130 may be attached to an end 124 of the base element 120, and may extend upwardly at an acute angle relatively to the base element 120. The cover element may comprise, generally, a relatively planar material, also having sufficient strength and rigidity to further hold an oyster while the oyster is held within the indentation 122 of the base element 120. The cover element 130 may cover or partially cover the oyster so that, when held by a user prying the oyster open with a knife, the user's hands may be protected. Moreover, the cover element 130 may comprise a semi-oval-shaped indentation 132, thereby holding the oyster therein so that the same may be shucked easily. Thus, the base element 120 and the cover element 130, and respective indentations 122, 132, may coordinate to both hold an oyster in place so that the same may be shucked by a user, and to shield the user from injury during the shucking process.

The cover element 130 may be connected to the base element 120 via a joint 140 between the base element 120 and the cover element 130. Preferably, the joint 140 may be a dovetail joint, comprising a pin 142 extending from end 134 of the cover element 130, which may be laterally inserted or slid into a socket 144 within the end 124 of the base element 120. Thus, the joint 140 may hold the cover element 130 on the base element 120 and effectively hold the oyster and protect the user's hands, as described above. The pin 142 may extend from the end 134 of the cover element 130 at an appropriate angle to ensure that the cover element 130 extends from the base element 120 at the desired acute angle.

As illustrated in FIG. 6, the cover element 130 may be slid laterally to move the cover element 130 relative to the base element 120. This may be accomplished by sliding the pin 142 through the socket 144 so that the cover element 130 moves laterally. This may be useful where an oyster is irregularly sized and/or shaped, and the cover element 130 may thus be moved so that the semi-oval-shaped indentation can be better positioned on the oyster and held in place for shucking the same. Moreover, the cover element 130 may be fully removed from the base element 120, as illustrated in FIG. 7, so that both the base element 120 and the cover element 130 may be cleaned. In addition, removal of the cover element 130 from base element 120 may be useful for storing the oyster shucker apparatus 100 when not in use.

Although FIGS. 5-7 illustrate pin 142 extending from cover element 130 and socket 144 disposed in base element 120, these parts may be switched, in that the cover element 130 may contain the socket and the base element 120 may contain the pin, and the present invention should not be limited as described herein.

In an alternate embodiment of the present invention, not shown in the drawings, the pin of the dovetail joint, as described above, may be rotatable or otherwise hinged and movable, such that the angle at which the pin extends from the cover element may change, thereby allowing the cover element to rotate toward and/or away from the base element. Thus, this may allow the oyster shucker apparatus to accommodate different sizes and shapes of oysters, and also may allow the cover element to move laterally as well, for further accommodating irregular sizes and/or shapes of oysters and for removing completely for cleaning and/or storage.

Figure 8:
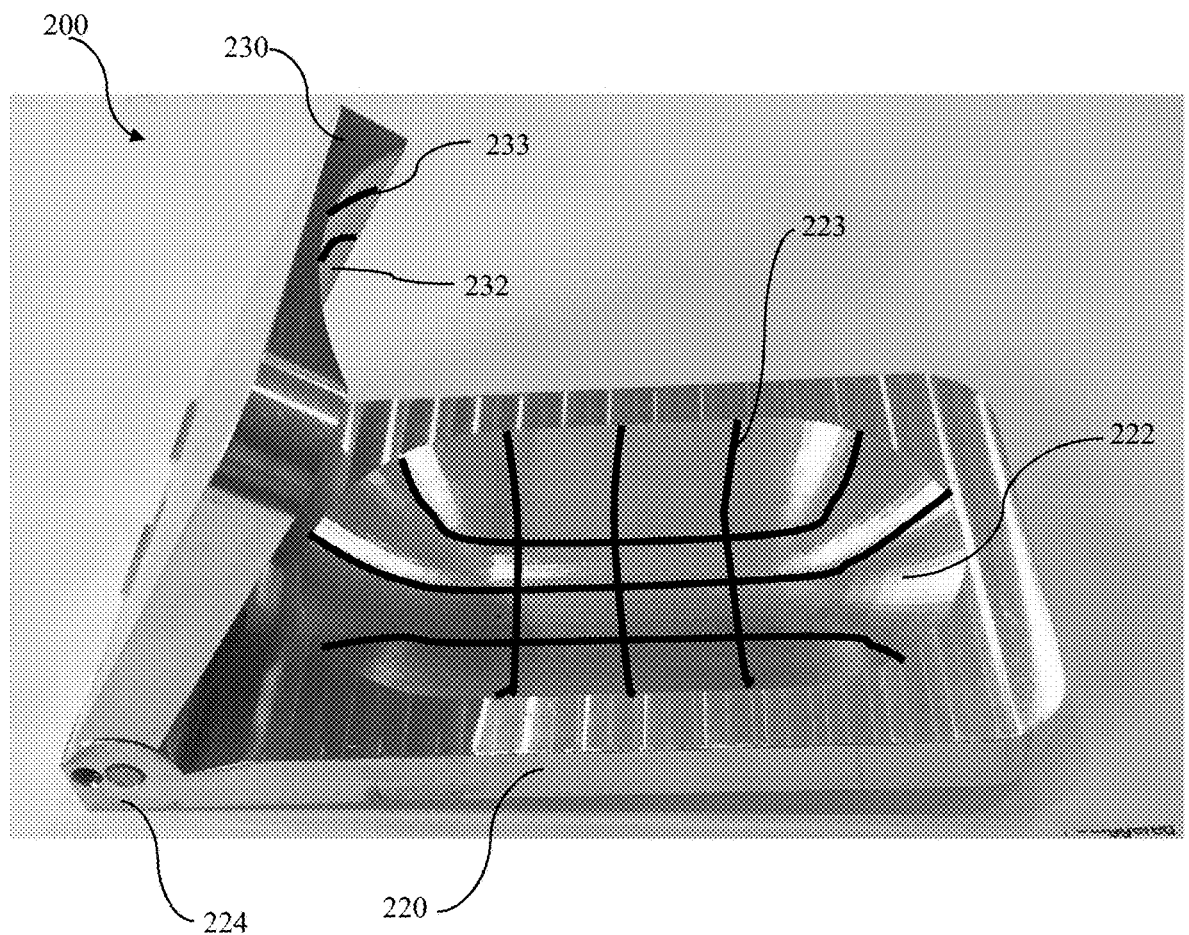
FIG. 8 illustrates a perspective view of an oyster shucker apparatus having a non-slip element or coating disposed on an inside surface of a recessed area thereof in an embodiment of the present invention.

In yet another alternate embodiment of the present invention, illustrated in FIG. 8, an oyster shucker apparatus 200 may comprises a base element 220 comprising, generally, a relatively planar material having sufficient strength and rigidity to hold an oyster therein while shucking the same, and providing shielding protection for a user or a surface on which the oyster is shucked, such as a table or the like. Preferably, the base element 220 is made from metal, such as aluminum, steel, or other like metals useful for both strength and rigidity, as noted above. However, the base element 220 may be made from plastic, wood, or any other material apparent to one of ordinary skill in the art. An oval-shaped indentation 222 may be provided in the base element 220, which may be useful to hold an oyster therein.

Within the oval-shaped indentation 222 may be a coating or other application 223 that may be provide a non-slip surface within the oval indentation 222. As illustrated in FIG. 8, the coating or other application 223 may be a plurality of ridges or ribs that may extend over the surface of the oval indentation 222, and may be configured to grip or hold the oyster in place when disposed therein. Thus, the coating or other application 223 may prevent or aid in preventing the oyster from moving when disposed therein when shucking the same. The coating or other application 223 may be in any shape, form, pattern. Likewise the coating or other application 223 may cover the entirety of the surface or portions thereof. Preferably, the coating or other application 223 may have a higher coefficient of friction with an oyster compared to the coefficient of friction of the oval-shaped indentation 222 without the coating or other application 223.

Preferably, the coating or other application 223 may be a rubber, elastomeric material that may provide a high amount of friction to an oyster disposed thereon. To provide strength to the coating or other application 223, a plastic base may be disposed on the surface of the oval indentation 222 and the coating or other application 223 may be provided therein. For example, a network of plastic ribs may be injection molded onto the oval indentation 222 of the base element 220, and the coating or other application 223, comprising the high friction material, may be disposed onto the network of plastic ribs.

A cover element 230 may be attached to an end 224 of the base element, and may extend upwardly at an acute angle relatively to the base element 20. The cover element may comprise, generally, a relatively planar material, also having sufficient strength and rigidity to further hold an oyster while the oyster is held within the indentation 222 of the base element 220. The cover element 230 may cover or partially cover the oyster so that, when held by a user prying the oyster open with a knife, the user's hands may be protected. Moreover, the cover element 230 may comprise a semi-oval-shaped indentation 232, thereby holding the oyster therein so that the same may be shucked easily. Thus, the base element 220 and the cover element 230, and respective indentations 222, 232, may coordinate to both hold an oyster in place so that the same may be shucked by a user, and to shield the user from injury during the shucking process.

Within the semi-oval-shaped indentation 232 may be a coating or other application 233 that may be provide a non-slip surface within the semi-oval-shaped indentation 232. As illustrated in FIG. 8, the coating or other application 233 may be a plurality of ridges or ribs that may extend over the surface of the semi-oval-shaped indentation 232, and may be configured to grip or hold the oyster in place when disposed therein. Thus, the coating or other application 233 may prevent or aid in preventing the oyster from moving when disposed therein when shucking the same. The coating or other application 233 may be in any shape, form, pattern. Likewise, the coating or other application 233 may cover the entirety of the surface or portions thereof of the semi-oval-shaped indentation 232. Preferably, the coating or other application 233 may have a higher coefficient of friction with an oyster compared to the coefficient of friction of the semi-oval-shaped indentation 232 without the coating or other application 233.

Preferably, the coating or other application 233 may be a rubber, elastomeric material that may provide a high amount of friction to an oyster disposed thereon. To provide strength to the coating or other application 233, a plastic base may be disposed on the surface of the semi-oval-shaped indentation 232 and the coating or other application 233 may be provided therein. For example, a network of plastic ribs may be injection molded onto the semi-oval-shaped indentation 232 of the base element 230, and the coating or other application 233, comprising the high friction material, may be disposed onto the network of plastic ribs.

It should be noted that various changes and modifications to the presently preferred embodiments described herein will be apparent to those skilled in the art. Such changes and modifications may be made without departing from the spirit and scope of the present invention and without diminishing its attendant advantages. Further, references throughout the specification to "the invention" are non-limiting, and it should be noted that claim limitations presented herein are not meant to describe the invention as a whole. Moreover, the invention illustratively disclosed herein suitably may be practiced in the absence of any element which is not specifically disclosed herein.

We claim:

1. An oyster shucker apparatus comprising:
   a base element comprising a first planar material having a first end and a second end;
   a cover element comprising a second planar material rotatably attached on a first end thereof to the first end of the base element via a hinge;
   and a coating disposed on a surface of at least one of the base element and the cover element, wherein the coating provides a surface having a higher friction than the base element or the cover element, respectively.

2. The oyster shucker apparatus of claim 1 further comprising:
   an indentation in the base element configured to hold the oyster therein, wherein the coating is disposed on a surface of the indentation of the base element.

3. The oyster shucker apparatus of claim 1 further comprising:
   an indentation in the cover element configured to hold the oyster therein, wherein the coating is disposed on a surface of the indentation of the cover element.

4. The oyster shucker apparatus of claim 1 further comprising:
   a first indentation in the base element, wherein the coating is disposed on a surface of the first indentation; and
   a second indentation in the cover element, wherein a second coating is disposed on a surface of the second indentation,
   wherein the first and second indentations are configured to hold an oyster therein.

5. The oyster shucker apparatus of claim 1 wherein the base element comprises a first knuckle and the cover element comprises a second knuckle, wherein a pin holds the first knuckle and the second knuckle together to from a hinge.

6. The oyster shucker apparatus of claim 5 further comprising:
   an angled surface on the base element, wherein the angled surface is configured to abut in parallel a bottom surface of the cover element when the cover element is rotated toward the base element.

7. The oyster shucker apparatus of claim 5 wherein the cover element extends upwardly from the base element at the hinge at an acute angle.

8. The oyster shucker apparatus of claim 1 further comprising:
   a lip extending downwardly at the second end of the base element, the lip configured to abut a side surface of a table on which the apparatus is placed.

9. An oyster shucker system comprising:
   the oyster shucker apparatus of claim 1; and
   an oyster contained between the base element and the cover element.

10. The oyster shucker system of claim 9 further comprising:
    a knife configured to pry open the oyster contained between the base element and the cover element.

11. A method of shucking an oyster comprising the steps of:
    providing the oyster shucker apparatus of claim 1;
    placing an oyster between the base element and the cover element; and
    opening the oyster using a knife by prying the oyster open while the oyster is disposed between the base element and the cover element.

12. The method of claim 11 further comprising the steps of:
    providing a hinge connecting the base element to the cover element; and
    rotating the cover element toward and away from the base element to accommodate the size of the oyster contained therebetween.

13. An oyster shucker apparatus comprising:
    a base element comprising a first planar material having a first end and a second end; and
    a cover element comprising a second planar material removably attached on a first end thereof to the first end of the base element;
    a coating disposed on a surface of at least one of the base element and the cover element, wherein the coating provides a surface having a higher friction than the base element or the cover element, respectively, wherein the cover element and the base element form a space therebetween, wherein the space is configured to hold an oyster therein for shucking the same with a knife.

14. The oyster shucker apparatus of claim 13 further comprising:
   an extending element extending from the first end of the cover element; and
   a receiving aperture within the first end of the base element, wherein the extending element of the cover element is slidably disposed within the receiving aperture of the base element.

15. The oyster shucker apparatus of claim 13 further comprising:
   an extending element extending from the first end of the base element; and
   a receiving aperture within the first end of the cover element, wherein the extending element of the base element is slidably disposed within the receiving aperture of the cover element.

16. The oyster shucker apparatus of claim 13 wherein the base element and the cover element are held together with a dovetail joint.

17. The oyster shucker apparatus of claim 13 further comprising:
   a first indentation in the base element, wherein the coating is disposed on a surface of the first indentation; and
   a second indentation in the cover element, wherein a second coating is disposed on a surface of the second indentation,
   wherein the first and second indentations are configured to hold an oyster therein.

18. The oyster shucker apparatus of claim 13 further comprising:
   a lip extending downwardly at the second end of the base element, the lip configured to abut a side surface of a table on which the apparatus is placed.

19. The oyster shucker apparatus of claim 13 wherein the cover element extends upwardly from the base element at the hinge at an acute angle.

20. An oyster shucker system comprising:
   the oyster shucker apparatus of claim 13; and
   an oyster contained between the base element and the cover element.

* * * * *